(12) United States Patent
Krien et al.

(10) Patent No.: US 7,168,199 B2
(45) Date of Patent: *Jan. 30, 2007

(54) PORTABLE SEAT AND PLATFORM SUPPORT

(76) Inventors: Gary L. Krien, 4672 W. Stimmel Rd., Salina, KS (US) 67401; David A. Krien, 1305 Elm, Hays, KS (US) 67601

(*) Notice: Subject to any disclaimer, the term of this patent is extended or adjusted under 35 U.S.C. 154(b) by 0 days.

This patent is subject to a terminal disclaimer.

(21) Appl. No.: 11/032,637

(22) Filed: Jan. 10, 2005

(65) Prior Publication Data

US 2005/0183320 A1    Aug. 25, 2005

Related U.S. Application Data

(62) Division of application No. 10/421,294, filed on Apr. 23, 2003, now Pat. No. 6,895,709.

(60) Provisional application No. 60/377,169, filed on Apr. 30, 2002.

(51) Int. Cl.
*F41C 27/22* (2006.01)

(52) U.S. Cl. .................... 42/94; 42/93; 42/90

(58) Field of Classification Search .......... 42/94; 248/122.1, 125.3, 125.7, 125.9, 425, 598; 297/240, 241

See application file for complete search history.

(56) References Cited

U.S. PATENT DOCUMENTS

| | | | |
|---|---|---|---|
| 554,661 A | 2/1896 | Doolittle | 248/163.1 |
| 1,187,325 A * | 6/1916 | Ivey | 248/145 |
| 1,639,722 A | 8/1927 | Clark | |
| 2,079,510 A | 5/1937 | King et al. | 248/145 |
| 2,821,117 A | 1/1958 | Hultgren | 89/37 |
| 3,125,929 A | 3/1964 | Peasley | 89/37 |
| 3,225,656 A | 12/1965 | Flaherty et al. | 89/37 |
| 3,711,984 A | 1/1973 | Dyer et al. | 42/94 |
| 4,266,748 A | 5/1981 | Dalton | 248/425 |
| D261,794 S | 11/1981 | Bechtel | 42/94 |
| 4,506,466 A | 3/1985 | Hall | 42/94 |
| 5,060,410 A | 10/1991 | Mueller | 42/94 |
| 5,149,900 A | 9/1992 | Buck | 42/94 |
| 5,173,563 A | 12/1992 | Gray | 42/94 |
| 5,271,175 A | 12/1993 | West, III | 42/94 |
| 5,287,643 A | 2/1994 | Arizpe-Gilmore | 42/94 |
| 5,347,740 A | 9/1994 | Rather et al. | 42/94 |
| 5,414,949 A | 5/1995 | Peebles | 42/94 |
| 5,421,115 A | 6/1995 | McKay | 42/94 |
| 5,438,786 A * | 8/1995 | Hilderbrand | 42/94 |
| 5,481,817 A | 1/1996 | Parker | 248/286.1 |

(Continued)

*Primary Examiner*—Michelle Clement
*Assistant Examiner*—Stewart Knox
(74) *Attorney, Agent, or Firm*—Westman, Champlin & Kelly, P.A.

(57) ABSTRACT

A portable seat and platform support includes a shaft with a base mounted to its lower end to position the shaft to a generally vertical orientation. A removable platform can be attached to the upper end of the shaft, and a seat assembly is supported by a fastener assembly along the shaft for independent rotation about the shaft axis. The seat assembly includes a collar slidably attached to the shaft, a seat supported by the collar, and a bearing on the collar. The fastener assembly includes an adjustment device to support the collar at a selected location along the shaft axis, and a bearing portion supported by the adjustment device and journaled to the bearing on the collar.

21 Claims, 5 Drawing Sheets

U.S. PATENT DOCUMENTS

| | | | |
|---|---|---|---|
| 5,491,921 A | 2/1996 | Allen | 42/94 |
| 5,529,374 A * | 6/1996 | Wimberly, Jr. | 297/240 |
| 5,715,625 A | 2/1998 | West, III | 42/94 |
| 5,746,334 A * | 5/1998 | Brandenberg | 211/205 |
| 5,833,308 A | 11/1998 | Strong, III et al. | 297/172 |
| 5,884,966 A | 3/1999 | Hill et al. | 297/170 |
| 5,906,284 A | 5/1999 | Hammerstrom et al. | 248/125.1 |
| 6,039,392 A | 3/2000 | Dencker | |
| 6,058,641 A | 5/2000 | Vecqueray | 42/94 |
| 6,269,578 B1 | 8/2001 | Callegari | 42/94 |
| 6,276,087 B1 | 8/2001 | Singletary | 42/94 |
| 6,895,709 B1 * | 5/2005 | Krien et al. | 42/94 |

* cited by examiner

PORTABLE SEAT AND PLATFORM SUPPORT

CROSS-REFERENCE TO RELATED APPLICATION

This is a divisional of application Ser. No. 10/421,294, filed Apr. 23, 2003 now U.S. Pat. No. 6,895,709.

This Application claims benefit of Provisional Application No. 60/377,169 for "Bench Rest" filed Apr. 30, 2002 by Gary L. Krien.

FIELD OF THE INVENTION

This invention relates to seat and platform supports, such as bench rests for supporting firearms, and particularly to seat and platform supports that may be disassembled for ease of transport.

BACKGROUND OF THE INVENTION

Bench rests are used by shooters to support firearms, particularly rifles, during adjustment of firearm sights (including scopes), bench rest shooting sports, and hunting. A bench rest is characterized by a frame supporting a rest, which in turn supports the firearm. Some bench rests include a mechanism for rigidly mounting the firearm to the frame (in which case the bench rest is used primarily for adjusting the firearm sights), while others employ a platform for supporting the firearm and/or portions of the upper torso (which may include the arms) of the user. Some bench rests may be collapsed or disassembled for ease of transport, such as for backpacking or storage, while other bench rests are more permanent in nature for use at shooting ranges and the like. Some bench rests include seats supporting the user during firing of the firearm, others do not.

The present invention is directed to a seat and platform support, such as for a bench rest, of the type that may be easily disassembled and re-assembled at a site. More particularly, the present invention is directed to a bench rest that can be disassembled into a minimal number of parts, wherein the platform is adjustable to accommodate left- and right-handed users, and the seat is movable relative to the bench rest platform without adjustment of any fastener so that the user may quickly adjust to various shooting orientations. This latter feature is particularly important for bench rest shooting sports employing moving targets and for hunting, and permits the user to rotate the shooting orientation through a reasonable shooting field.

Vecqueray, in U.S. Pat. No. 6,058,641, describes a bench rest having central shaft with collapsible legs pivotally attached to one end of the shaft. A removable seat assembly includes a collar that may be slipped over the free end of the shaft and fastened to the shaft by a manually-operable set screw to set the vertical and angular positions of the seat relative to the shaft. A removable bench rest platform includes a collar fastened over the free end of the shaft to complete the bench rest. While Vecqueray's bench rest can be disassembled into three parts and provides independent adjustment of the seat to accommodate various users, it does not permit quick rotation of the seat to various shooting orientations through a reasonable shooting field.

Mueller, in U.S. Pat. No. 5,060,410, describes a bench rest having a triangular support structure having a shaft forming one leg of the structure. The shaft can be assembled to a base to support a bench rest platform. An arm is rotatably attached to the shaft to support an adjustable and removable cantilevered seat. While the Mueller bench rest accommodates various users and permits quick rotation of the seat to various shooting orientations, the triangular support structure is bulky and not altogether satisfactory for easy transport to the field.

There is a need, therefore, for a stable, portable seat and platform assembly which is easily transportable and which has a seat assembly that accommodates various users and allows for quick rotation of the seat to various shooting orientations. There is also a need for a seat and platform support that can be alternatively converted to a bench rest or utility table.

SUMMARY OF THE INVENTION

According to a first embodiment of the invention, a seat and platform assembly includes a shaft having a longitudinal axis. A base is attached to the shaft adjacent a lower end to position the shaft to a generally vertical orientation, and a platform is removably attached to an upper end of the shaft. A collar is slidably assembled to the shaft and a fastener assembly selectively positions the collar along the longitudinal axis. A seat assembly is supported by the collar. In some embodiments, a bearing portion on the fastener assembly is journaled to a bearing portion on the collar so that the seat assembly can rotate about the longitudinal axis. In other embodiments, the fastener assembly includes a plurality of pin-receiving apertures spaced along the shaft and a pin receivable in one of the apertures to support the collar at a selected location along the longitudinal axis.

In preferred embodiments, legs are attachable to leg receivers on the base and are removable. Additionally, by removing the platform, the seat assembly can be removed from the shaft.

In some embodiments, the shaft has a cavity having an axial opening at the lower end. A stabilizing pin in the cavity is arranged to extend through the opening to support the shaft along its axis.

In some embodiments, the platform is a bench rest platform and is rotatable about the shaft axis independently of rotation of the seat assembly.

In other embodiments, the support structure supports a plurality of seat assemblies for a single table top platform for a utility table.

DETAILED DESCRIPTION OF THE PREFERRED EMBODIMENTS

Figure 1:
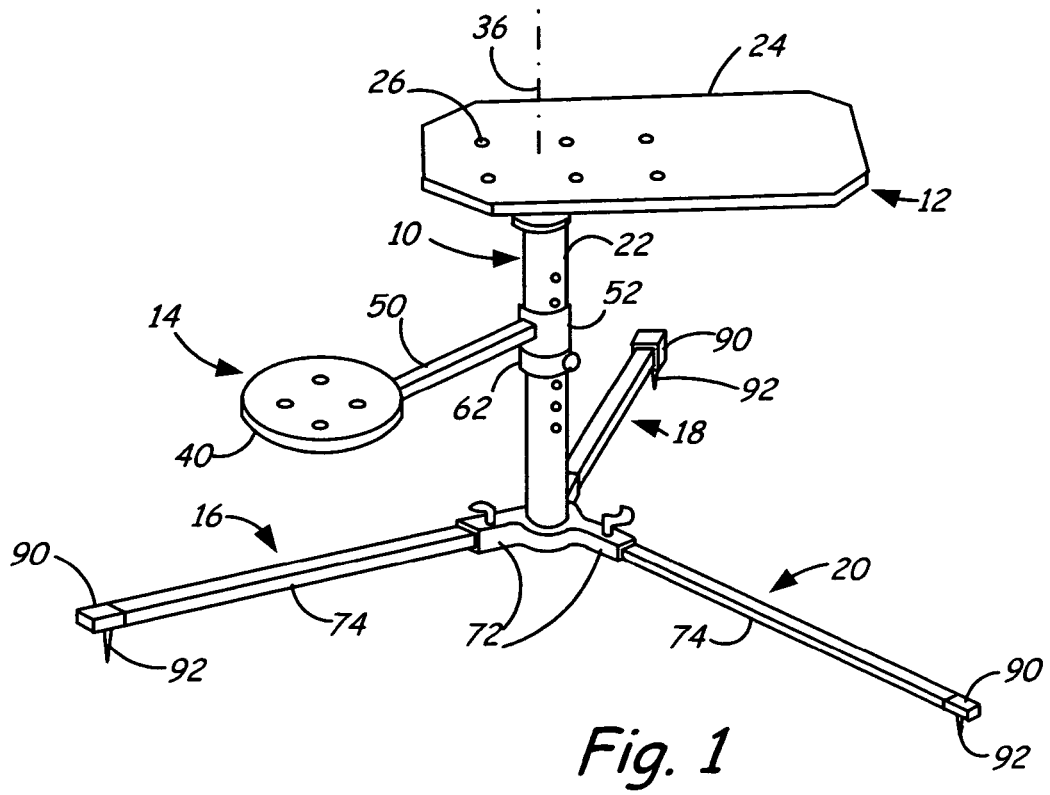
FIG. 1 is a perspective view of a seat and platform support assembly according to a first embodiment of the present invention wherein the support assembly supports a bench platform to form a bench rest.

FIG. 1 is a perspective view of a portable seat and platform support in accordance with a first embodiment of the present invention. The structure illustrated in FIG. 1 is a bench rest and includes a main support assembly 10, a platform assembly 12, a seat assembly 14, and three leg assemblies 16, 18 and 20. In one embodiment, main support 10 preferably comprises a rigid cylindrical member 22 formed of number 1 tubular steel.

Figure 2:
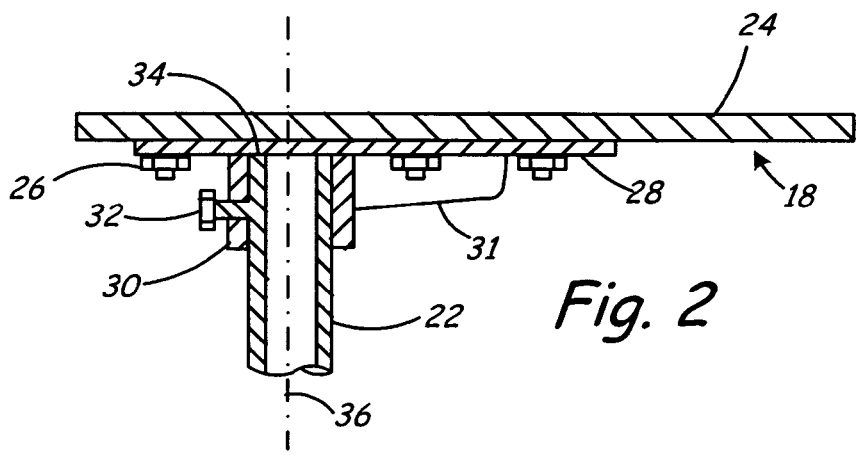
FIG. 2 is a section view illustrating the attachment of a platform assembly to the support assembly of FIG. 1.

As shown particularly in FIG. 2, platform assembly 12 comprises a flat, substantially rectangular (with corners chamfered), polycarbonate or other suitable plastic platform 24, attached by bolts and nuts 26 to steel plate 28. Cylindrical collar 30 is rigidly attached to plate 28 at a position offset from the center of the plate so that a substantial portion of platform 24 extends to one side of the collar. A threaded fastener 32 having a hand-operated knob is received in a threaded receptacle of collar 30. Steel gussets 31 are rigidly attached to plate 28 and collar 30 to increase support for platform 24. Conveniently, collar 30 and gussets 31 are secured to each other and to plate 28 by welding. Collar 30 is arranged to fit over tubular member 22 so that the upper end 34 of tubular member 22 bears against plate 28 within collar 30. In preferred embodiments shown in FIG. 2, member 22 and collar 30 may be tubular, but the exact shape may be of any desirable mating shape. Also preferably, the bolts fastening platform 24 to plate 28 are counter-sunk from the top surface of the platform so that protrusions above the nominal top surface of the platform are avoided.

Figure 3:
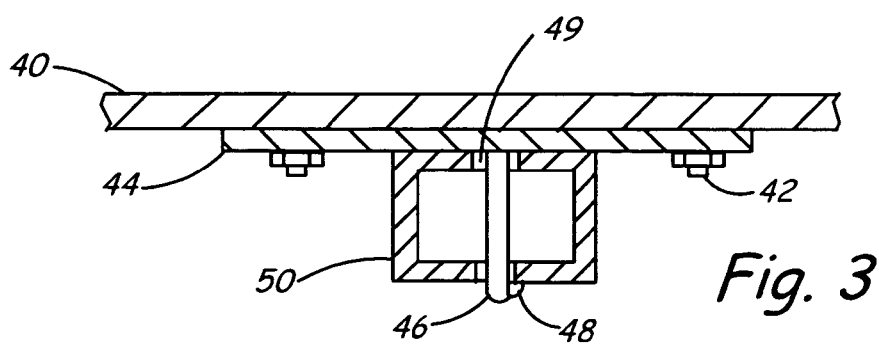
FIG. 3 is a section view of a portion of the seat assembly for the for the support assembly of FIG. 1.
Figure 4:
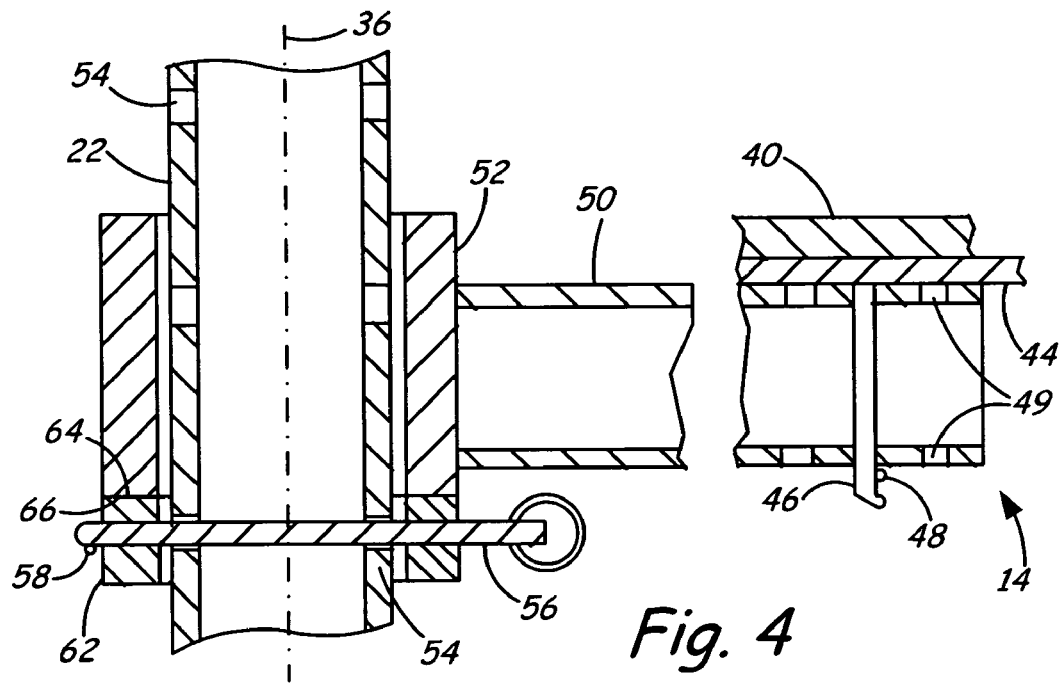
FIG. 4 is a section view illustrating the attachment of a seat assembly to the support assembly of FIG. 1.

FIGS. 3 and 4 illustrate seat assembly 14 comprising a circular polycarbonate seat member 40 attached by bolts and nuts 42 to steel plate 44. Pin 46, which includes a spring-loaded detent 48, is rigidly attached, such as by welding or a threaded connection, to plate 44 to extend through an aperture 49 in rectangular arm member 50. The opposite end of member 50 is attached to collar 52, such as by welding, which in turn slidably fits over and slidably receives tubular member 22. In preferred embodiments, collar 52 is a circular tubular member, although the shape of collar 52 is dependent on the shape of member 22 to which it is assembled. Arm 50 is preferably a square tubular steel member, although the member may be solid and may be of any desired shape.

As shown particularly in FIG. 4, a fastener assembly includes a steel ring 62 assembled over tubular member 22 below collar 52 and includes an aperture to receive a pin 56 having a spring-loaded detent 58. Apertures 54 are spaced at intervals along the length of member 22 to receive pin 56. Ring 62 is slidably received over member 22, and therefore has a shape dependent on the shape of member 22. When ring 62 is positioned so that its aperture is aligned with an aperture 54 through member 22, pin 56 may be inserted through the aligned apertures to fix a position of ring 62 along axis 36 of member 22.

Ring 62 includes a smooth bearing surface 64 that engages smooth bearing surface 66 on collar 52, forming a journal coupling that permits rotation of collar 52 and seat assembly 14 about axis 36 relative to support member 22. Pin 56 is engaged to a selected aperture 54 to adjust the height of seat 40 relative to the ground support plane and relative to platform 24. Pin 46 on seat assembly 14 is received in a selected aperture 49 in arm 50 to adjust the radial position of seat 40 relative to axis 36. Thus, seat 40 may be positioned at a height and position relative to the ground and platform 24 by coupling of pins 46 and 56 to selected apertures.

Figure 5:
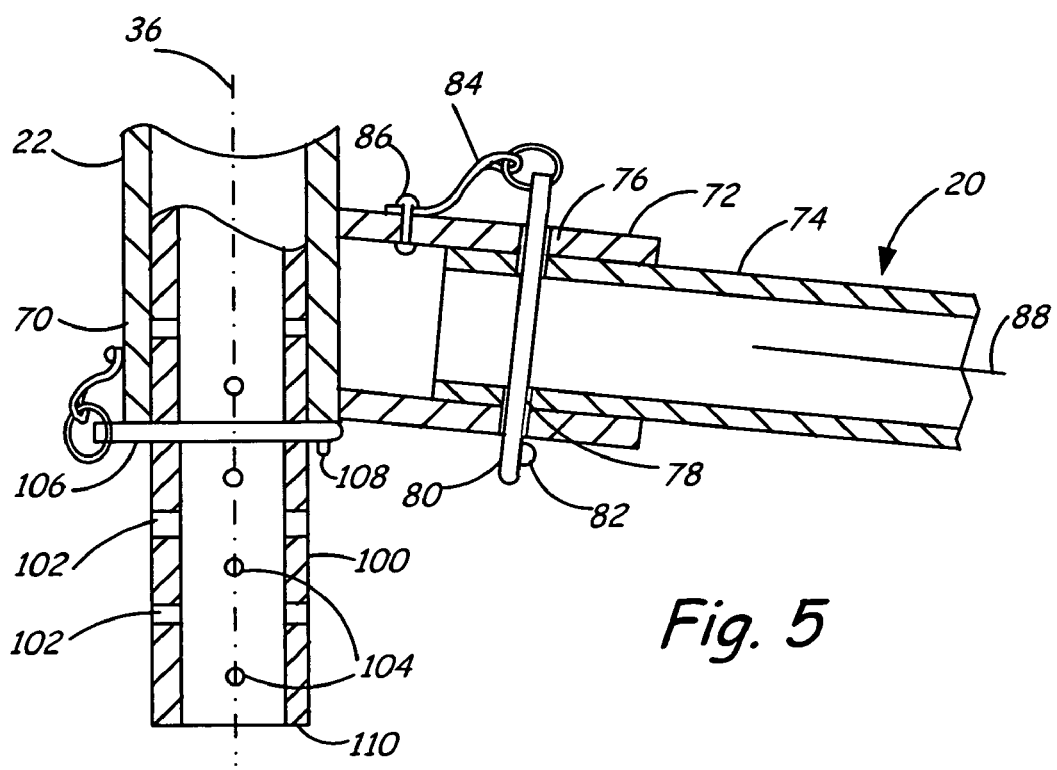
FIG. 5 is a section view illustrating the attachment of legs to the support assembly of FIG. 1.

As shown in FIGS. 1 and 5, a plurality (e.g., three) of steel receivers 72 are attached, such as by welding, to the lower end 70 of member 22 for receiving respective steel legs 74. In preferred embodiments, receivers 72 and legs 74 may have square tubular cross-sections, but the cross-section may be of any desirable mating shape. Each receiver 72 and each leg 74 includes an aperture 76, 78 for receiving locking pin 80. When coupled, leg 74 and receiver 76 are rigidly engaged. Spring-loaded detent 82 prevents pin 80 from becoming accidentally dislodged from the apertures. Strap 84 is attached to receiver 72 by rivet 86 to tether pin 80 to the receiver. Preferably, receivers 72 and legs 74 extend along axes 88 to form an acute angle to axis 36. In preferred embodiments the acute angle is 82° so that feet 90 (FIG. 1) engage the ground surface maintaining the lower end 70 of shaft 22 a slight distance from the ground. Preferably, gripping pins 92 extend downwardly from feet 90 to pierce the ground plane and provide a secure engagement to the ground. Optionally, gripping pins 92 may be removably attached to feet 90, such as by a detent or a threaded assembly.

Platform assembly 12 is rotatable about axis 36 of tubular member 22 by rotating collar 30 relative to tubular member 22. This feature permits positioning platform 24 to accommodate both left-handed and right-handed users. Fastener 32 may be tightened against tubular member 22 to fix a position for, and inhibit rotation of, platform 24. Collar 52 and seat assembly 14 are supported by ring 62, and is freely rotatable about axis 36.

In use, a user seated on seat platform 40 will slightly straddle center support 22 and position his/her arms and firearm on platform 24. Platform 24 is positioned so that the large portion of the platform is to the left or right of the user, depending on the user's preference. With the user so positioned, the user may press his/her feet against the ground to rotate seat platform 40 about axis 36. Movement of the seat platform carries the user's torso to thereby rotate the gunstock of the firearm. In this manner, the user can maintain precise positioning of the firearm while moving firearm across a field of view. This feature is particularly useful to permit the user to readjust positions for moving targets.

The apparatus may be disassembled from that illustrated in FIG. 1 by loosening fastener 32 and slipping platform assembly 12 from tube 22. Collar 52 and seat assembly 14 are then removed over the now open upper end 34 of tube 22, leaving pin 56 engaging ring 62 to the respective aperture 54 of tube 22. Pins 76 are disengaged from legs 74 and receivers 72 allowing the legs to be removed from the receivers, thereby completing the disassembly into six parts. Preferably, pin 56 is left in the selected aperture 54 to leave ring 62 fastened to member 22. This permits the seat assembly to be positioned to the previously set elevation without readjustment. Consequently, it is not necessary to tether pin 56 to ring 62, but such a tether may optionally be used. It is also preferred to leave seat 40 coupled to arm 50 with pin 46 engaged to the selected aperture 49. This permits retention of the seat position relative to axis 36 upon re-assembly of the structure.

In some embodiments, the support structure is constructed of 1-4-inch number 1 steel. In other embodiments, the support structure is constructed of a light-weight material, such as ¼-inch aluminum, rather than steel. Construction of the bench rest using a light-weight material allows easy portability of the bench rest to field locations. However, an aluminum structure may tend to slightly flex due to the user's weight when supported on the seat. Moreover, movement of the user may cause the aluminum structure to modulate. To reduce movement of the support structure due to flexing or modulation of the structure, particularly where the support structure is constructed of aluminum, it is desirable to include optional stabilizing pin 100 illustrated in FIG. 5.

Pin 100 comprises a tubular or solid cylindrical member having apertures 102 and 104 arranged to receive pin 106, which may have a detent 108. With the bench rest unit supported on the ground support, stabilizing pin 100 in the central opening in member 22 slides downwardly so that the lower end 110 of pin 100 engages the ground support. The position of stabilizing pin 100 is locked by lock pin 106 received in an appropriate aperture 102 or 104. As shown in FIG. 5, apertures 102 are pairs of diametrically-opposed apertures, and are spaced at intervals along the length of stabilizing pin 100, such as centered at ½-inch (1.27 cm) intervals, to receive lock pin. Similarly, apertures 104 are offset from apertures 102 and spaced at ½-inch intervals along the length of stabilizing pin 100, 90° from apertures 102. This arrangement allows close spacing of the apertures 102 and 104 and allows adjustment of stabilizing pin to within ¼ (0.63 cm) inch along axis 36.

Figure 6:
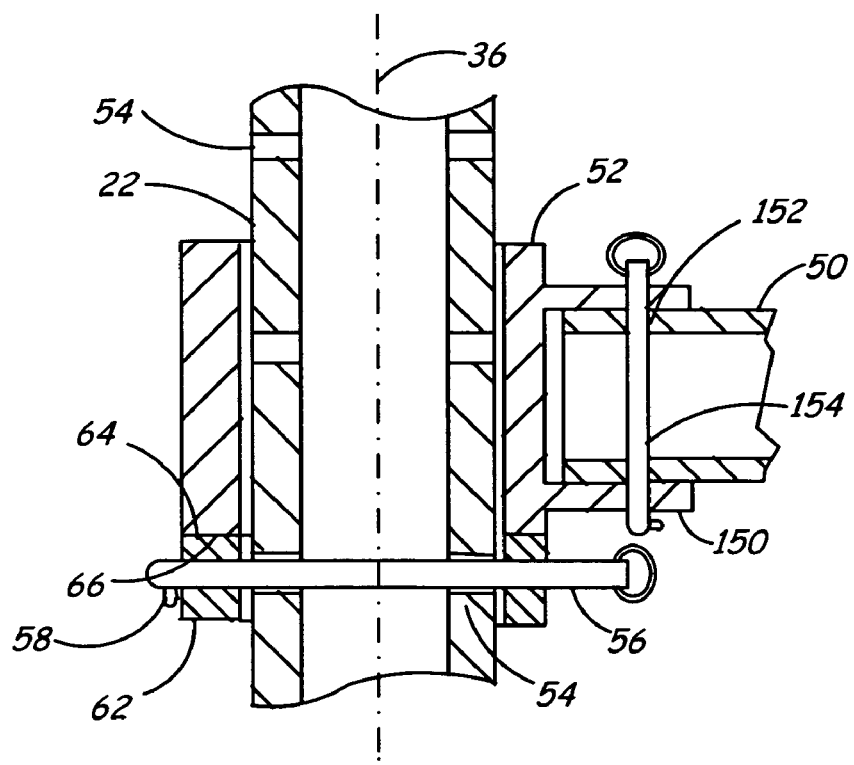
FIG. 6 is a section view, as in FIG. 4, of the attachment of a seat assembly to the support assembly in accordance with a modification of the present invention.

FIG. 6 is a section view of a modification of the seat attachment mechanism for attaching seat 40 to support member 22. In this case, support arm 50 terminates at an end distal from seat 40 (not shown in FIG. 6) and is received in receiver 150 which is rigidly attached, such as by welding, to collar 52. Like receivers 72 that receive individual legs 74 (FIG. 5), receiver 150 is sized and shaped relative to arm 50 to receive the free end of arm 50. Thus, if arm 50 is a square tubular arm, receiver 150 is also a square tubular mechanism. Receiver 150 and arm 50 include an aperture 152 arranged to receive locking pin 154 having a detent to lock arm 50 to receiver 150. Preferably, pin 154 is tethered to arm 50 by a tether (not shown).

The attachment mechanism of FIG. 6 permits removal of the seat assemblies from the main support without removing collar 52. The attachment mechanism of FIG. 6 is particularly useful in connection with a conversion of the support structure to a utility table as shown in FIGS. 7–10.

Figure 8:
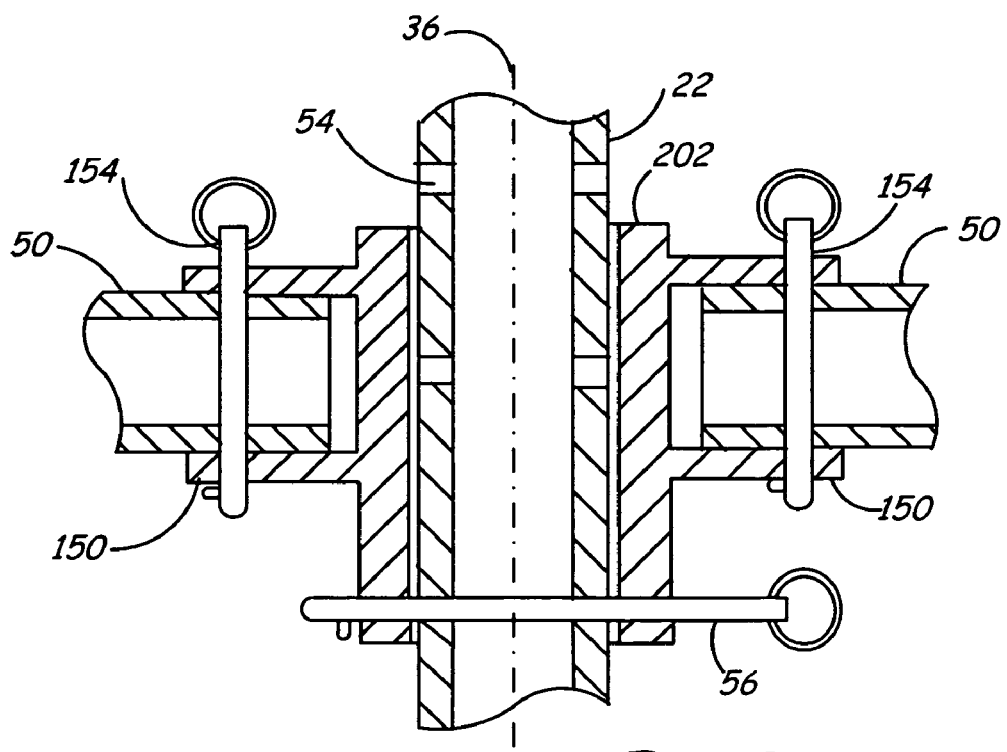
FIG. 8 is a section view of a modification of a seat attachment arrangement for the table illustrated in FIG. 7.
Figure 7:
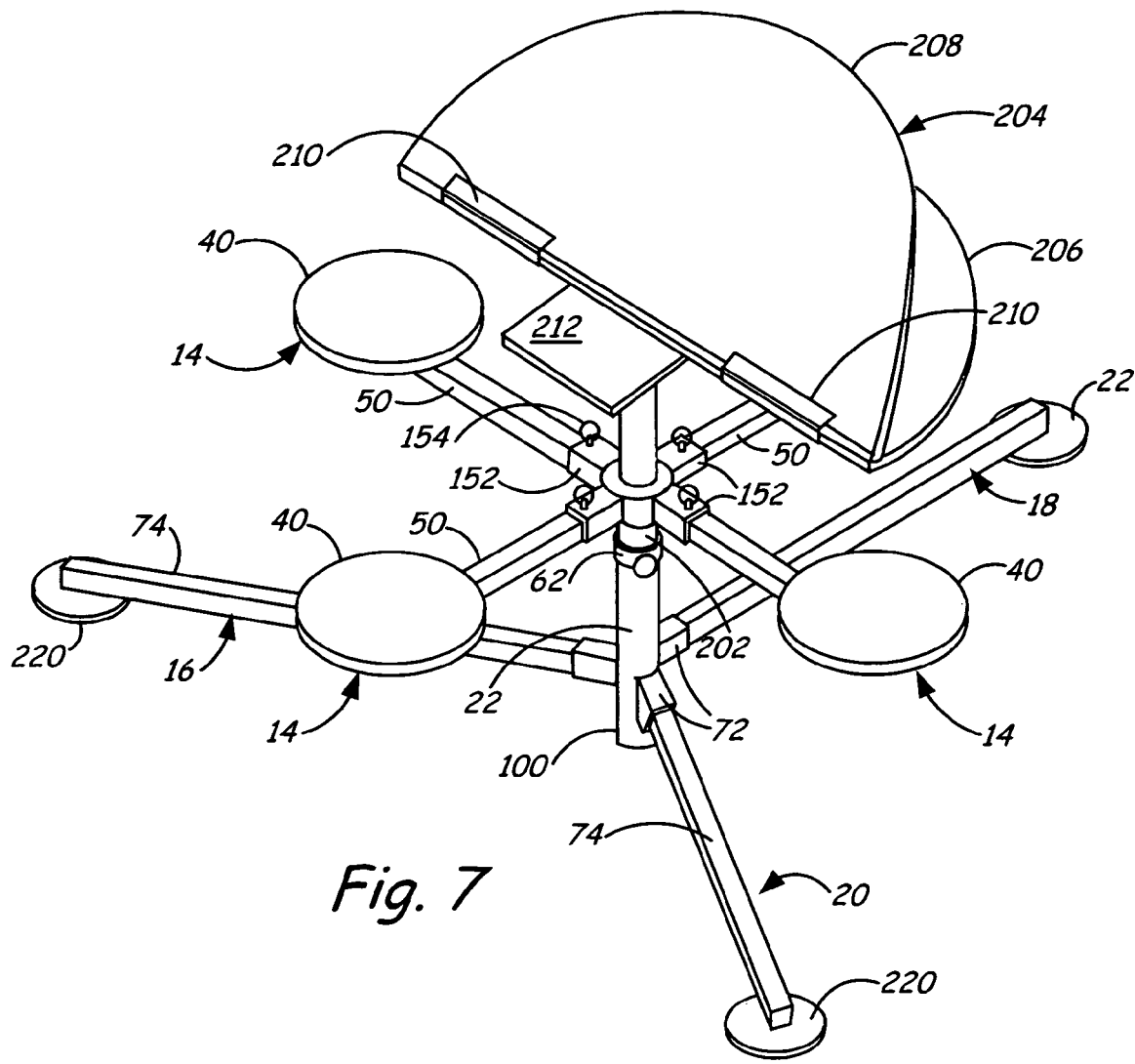
FIG. 7 is a perspective view of a utility table in accordance with another embodiment of the present invention.

FIG. 7 is a perspective view of a utility table employing the portable seat and platform support in accordance with the present invention. The table illustrated in FIG. 7 employs a main support assembly 10, a plurality of seat assemblies 14 and leg assemblies 16, 18 and 20. The table illustrated in FIG. 7 is similar to the bench rest illustrated in FIG. 1. However, instead of a single seat assembly 14 as in the bench rest shown in FIG. 1, the table shown in FIG. 7 has a plurality of seat assemblies (such as four), each with an arm 50 supporting a seat 40. Each arm 50 is received a corresponding receiver 152 attached to collar 202, and is locked to the receiver by lock pin 154 having a detent (not shown in FIG. 7) to prevent accidental dislodging. Collar 202 is supported by ring 62, which is locked to member 22 by pin 56 as described in connection with FIG. 3. Alternatively, ring 62 may be eliminated and the collar 202 extended for locking to member 22 by pin 56 as shown in FIG. 8. The embodiment illustrated in FIG. 8 is particularly useful because the seats cannot rotate about axis 36 relative to member 22, thereby increasing the stability of the table function.

Figure 9:
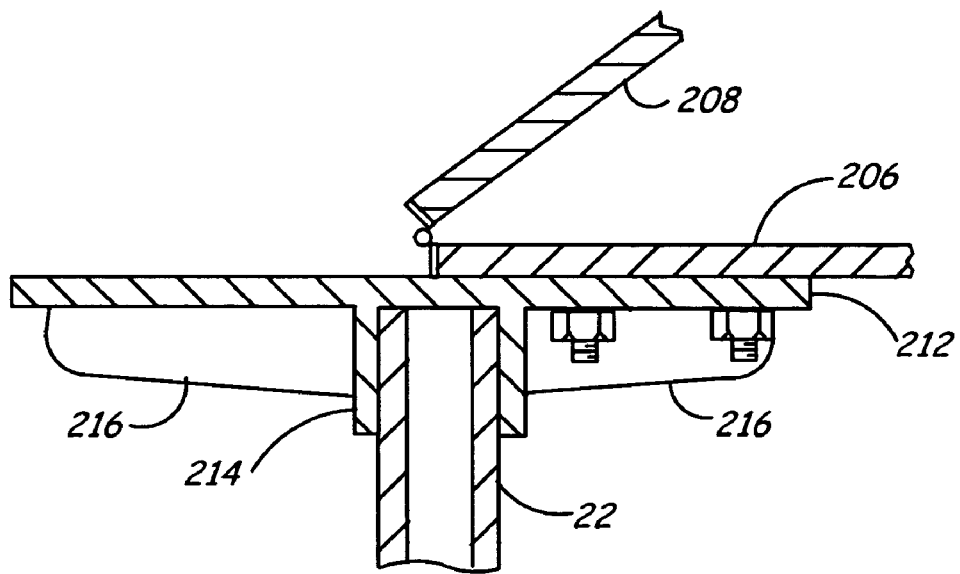
FIG. 9 is a section view illustrating attachment of the platform assembly to the support assembly of FIG. 7.

As shown in FIG. 9, instead of a bench platform, the support structure supports a table top, similar to a picnic table, to accommodate meals and other activities for users seated at the seat assemblies. Table platform 204 comprises flat polycarbonate or other plastic members 206 and 208, in the shape of a semi-circle, hinged together by hinges 210. Member 206 is bolted to plate 212. Collar 214, which receives the top end of member 22, is mounted to plate 212 at a central location so that when platform member 204 is extended or unfolded to form a single platform, the center of platform 204, and of plate 212, is supported by member 22 and member 208 is supported on plate 212. Collar 214 is constructed in a manner similar to collar 30 (FIG. 2) and includes a threaded fastener 32 that bears against member 22 to lock collar 214 to member 22. Gussets 216 are welded to collar 214 and plate 212 for added support of the platform.

As in the case of the bench rest of FIG. 1, legs 74 are received in individual receivers 72 as shown in FIG. 5. Also, as in the case of the apparatus illustrated in FIG. 5, stabilizing pin 100 may be received in member 22 for stabilizing the support mechanism as previously described.

Figure 10:
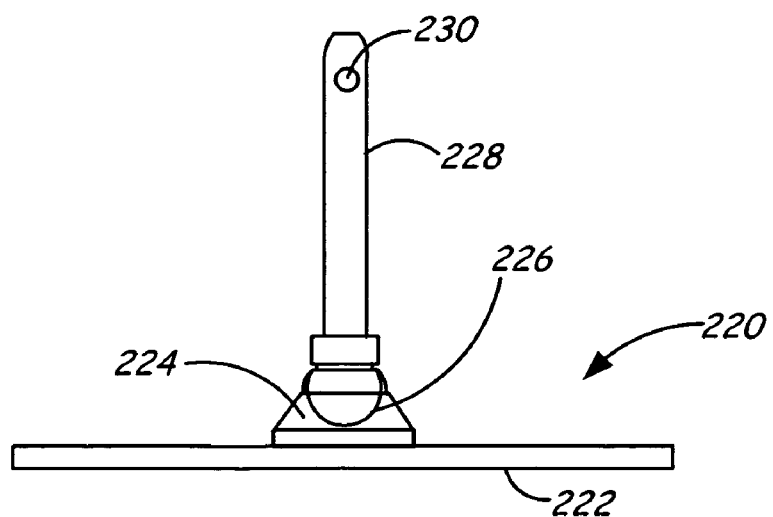
FIG. 10 is a section view of a modification of a foot assembly for use in the present invention.

FIG. 10 illustrates one form of a foot 220 for use at the ends of legs 74. A foot 220 may be used in place of each spike 92, as desired, and is particularly useful with the support structure functions as a table, as in FIG. 7. In this case, each foot 220 includes a pad 222 having a receiver 224 receiving a universal ball joint 226 attached to a shaft 228 received in a suitable aperture in foot 90 of each leg 74 (FIG. 1). Shaft 82 may, for example, be a pin with a detent 230 for locking to the respective leg, or may have a threaded portion for threaded attachment to the leg.

The table is used by folding open the table top and positioning the legs so that the feet conform to the uneven terrain of the ground and the table top is acceptably level. In some embodiments, the support structure may be utilized as both a bench rest and a utility table. More particularly, a bench rest shown in FIGS. 1–3 employing a seat assembly shown in FIG. 6 can be converted to one of the tables shown in FIGS. 7–10 by removing the bench platform 12 of FIGS. 1 and 2 and substituting collar 202 for collar 52. If the collar 202 shown in FIG. 8 is employed, ring 62 is also removed, and pin 56 that had locked ring 62 to member 22 is used to lock collar 202 to the member. The table top assembly 204 is then assembled over the top of member 22 in place of the bench rest platform 12. Arm 50 of seat assembly 14 is removed from receiver 150 in collar 52 and assembled to one of receivers 200 in collar 202. Thus, a group of four hunters, each having a bench rest with a seat assembly shown in FIG. 6, could assemble their seat assemblies to respective receivers 200 of a collar 202 for the table. The four hunters would only need collar 202 and table top assembly 204 to convert one of the support structures to a table.

While the utility table is described as receiving seat assemblies in the receivers of collar 202, other accessories, having suitable arms, might be received in the receiver. For example, an arm 50 might support a grill or other cooker, or a lantern or a support structure for hanging an accessory such as a lantern, thereby permitting the accessory to be supported by the support of the present invention adjacent the table platform.

Like the structure illustrated in FIGS. 1–5, the table illustrated in FIGS. 6–8 is portable and may be broken down into individual pieces for easy transportation. More particularly, seat assemblies 14 may be removed from receivers 200, and legs 74 may be removed from receivers 72. Table platform 204 may be removed (in the same manner as platform 12, FIG. 1) and folded for easy transportation. Thus, the table may be easily broken down to nine principal parts.

It will be appreciated by those skilled in the art that some elements may be different from that described due to the use of different materials. For example, for aluminum support structures, a U-shaped clamp with a fastener to draw the legs of the clamp into tight interference fit to shaft 22 may be used in place of tubular collar 30 and set screw 32.

Although the present invention has been described with reference to preferred embodiments, workers skilled in the art will recognize that changes may be made in form and detail without departing from the spirit and scope of the invention.

What is claimed is:

1. Apparatus comprising:
    a substantially cylindrical shaft having a longitudinal axis, the shaft having an upper end and a lower end and including a cavity having an axial opening at the lower end;
    a base mounted to the shaft at the lower end, the base being arranged to engage a support surface and position the longitudinal axis to a generally vertical orientation;
    a stabilizing pin in the cavity arranged to slidingly extend through the opening to engage the support surface at a location aligned to the axis;
    a platform removably attached to the upper end of the shaft;
    a first collar slidably assembled to the shaft intermediate the base and the upper end;
    at least one seat assembly supported by the first collar, the seat assembly including:
        a seat arm supported by the first collar, and
        a seat supported by the seat arm distal from the first collar;
    a plurality of pin-receiving apertures in the shaft spaced along the longitudinal axis; and
    a pin receivable in a selected pin-receiving aperture to support the first collar at a selected location along the longitudinal axis so that the first collar is freely rotatable about the axis.

2. The apparatus of claim 1, wherein the first collar is coupled to the shaft by the pin.

3. Apparatus of claim 1, wherein the platform includes:
    a second collar mounted to the platform, the second collar having an opening receiving the upper end of the shaft, and
    a platform lock selectively locking the second collar to the shaft so that the platform and second collar may be removed from the shaft and the first collar may be thereupon removed over the upper end of the shaft.

4. Apparatus of claim 1, further including
    a pin lock for locking the stabilizing pin to the shaft at a selected axial position.

5. Apparatus of claim 1, wherein the seat arm includes a plurality of spaced apertures, and the seat includes a mounting pin for assembly to a selected one of the apertures to position the seat at a selected radial position distal from the shaft.

6. Apparatus of claim 1, wherein the base includes:
    a housing having a plurality of leg receivers,
    a plurality of legs arranged to be attached to respective ones of the leg receivers, and
    a leg lock selectively locking each leg to the respective leg receiver so that the respective leg may be removed from the base.

7. Apparatus of claim 1, wherein the platform is a bench rest.

8. Apparatus of claim 1, wherein the first collar includes a plurality of arm receivers, each arm receiver being arranged to receive a seat arm of a respective seat assembly.

9. Apparatus of claim 8, wherein the platform includes:
    first and second platform members coupled by a hinge to form a table top,
    a second collar mounted to the first platform member, the second collar having an opening receiving the upper end of the shaft, and
    a platform lock selectively locking the second collar to the shaft so that the platform and second collar may be removed from the shaft and the first collar and seat assembly may be thereupon removed over the upper end of the shaft.

10. The apparatus of claim 9, wherein the platform further includes a rigid plate fastened to the first platform member and second collar, the plate supporting the second platform member when the second platform member is positioned relative to the first platform member to form the table top.

11. Apparatus comprising:
    a shaft having a longitudinal axis, the shaft having an upper end and a lower end and a cavity having an axial opening at the lower end;
    a base attached to the shaft adjacent the lower end and having a plurality of support legs extending radially from the shaft to engage a support surface;
    a platform removably attached to the upper end of the shaft;
    a seat assembly removably attached to the shaft intermediate the base and upper end; and
    a stabilizing pin in the cavity arranged to slidingly extend through the opening to engage the support surface at a location substantially aligned to the axis.

12. Apparatus of claim 11, further including a pin lock for selectively locking the stabilizing pin to an axial location.

13. An apparatus comprising:
    a substantially cylindrical shaft having a longitudinal axis, the shaft having an upper end and a lower end;
    a base mounted to the shaft at the lower end, the base being arranged to position the longitudinal axis to a generally vertical orientation;
    a platform having first and second platform members coupled by a hinge to form a table top, wherein the platform is removably attached to the upper end of the shaft;
    a first collar having a plurality of arm receivers, each arm receiver being arranged to receive a seat arm of a respective seal assembly, wherein the first collar is slidably assembled to the shaft intermediate the base and the upper end, the first collar including;
    at least one seat assembly supported by the first collar, the seat assembly including:
        a seat arm supported by the first collar, and
        a seat supported by the seat arm distal from the first collar;
    a plurality of pin-receiving apertures in the shaft spaced along the longitudinal axis;
    a pin receivable in a selected pin-receiving aperture to support the first collar at a selected location along the longitudinal axis so that the first collar is freely rotatable about the axis;
    a second collar mounted to the first platform member, the second collar having an opening receiving the upper end of the shaft; and a platform lock selectively locking the second collar to the shaft so that the platform and second collar may be removed from the shaft and the first collar and seat assembly may be thereupon removed over the upper end of the shaft.

14. The apparatus of claim 13, wherein the first collar is coupled to the shaft by the pin.

15. The apparatus of claim 13, wherein the base is arranged to engage a support surface, and the shaft includes a cavity having an axial opening at the lower end, the apparatus further including:

a stabilizing pin in the cavity arranged to slidingly extend through the opening to engage the support surface at a location aligned to the axis.

16. The apparatus of claim 15, further including a pin lock for locking the stabilizing pin to the shaft at a selected axial position.

17. The apparatus of claim 13, wherein the seat arm includes a plurality of spaced apertures, and the seat includes a mounting pin for assembly to a selected one of the apertures to position the seat at a selected radial position distal from the shaft.

18. The apparatus of claim 13, wherein the base includes:
a housing having a plurality of leg receivers,
a plurality of legs arranged to be attached to respective ones of the leg receivers, and
a leg lock selectively locking each leg to the respective leg receiver so that the respective leg may be removed from the base.

19. The apparatus of claim 18, wherein the base is arranged to engage a support surface, and the shaft includes a cavity having an axial opening at the lower end, the apparatus further including:
a stabilizing pin in the cavity arranged to slidingly extend through the opening to engage the support surface at a location aligned to the axis.

20. The apparatus of claim 13, wherein the platform is a bench rest.

21. The apparatus of claim 13, wherein the platform further includes a rigid plate fastened to the first platform member and second collar, the plate supporting the second platform member when the second platform member is positioned relative to the first platform member to form the table top.

* * * * *